Patented Aug. 29, 1939

2,170,854

UNITED STATES PATENT OFFICE 2,170,854

METHOXY ACETALDEHYDE AND PROCESS OF MAKING ALKOXY ACETALDEHYDES

Nathan L. Drake, College Heights, Md., assignor to Carbide and Carbon Chemicals Corporation, a corporation of New York No Drawing. Application February 24, 1936, Serial No. 65,424

9 Claims. (Cl. 260—602)

This invention relates to the production of alkoxy acetaldehydes; and more especially it concerns the catalytic dehydrogenation of the monoalkyl ethers of ethylene glycol. The invention has especial utility in the production of methoxy acetaldehyde.

Methoxy acetaldehyde is a light, mobile fluid, miscible with water in all proportions, and having a strong crotonaldehyde-like odor. It boils at 92.3° C. under a pressure of 770 mm. of mercury absolute; it has a specific gravity of .9818 at 25°/4° C., and a refractive index of 1.3878 at 25° C. The compound slowly polymerizes upon standing, apparently forming the meta polymer.

Methoxy acetaldehyde forms, with water at around atmospheric pressure, a constant boiling mixture, containing about 20% of water and boiling at about 88.8° C. under 770 mm. pressure absolute.

Among the more important objects of the present invention are: To provide for the catalytic dehydrogenation of the monoalkyl ethers of ethylene glycol; and to provide for the production in novel manner of alkoxy acetaldehydes, such as methoxy acetaldehyde.

According to the present invention, the vapors of a monoether of ethylene glycol are conducted over a dehydrogenation catalyst in a reaction zone maintained at a temperature within the range from about 300° C. to about 425° C. The reaction mixture containing the resultant alkoxy acetaldehyde and unreacted ether is condensed. The condensate then is fractionally distilled, preferably under atmospheric or subatmospheric pressure, and the aldehyde thereafter is separated from the unreacted ether and byproducts in manner hereinafter described.

When fractionally distilling the condensed reaction products resulting from the dehydrogenation of ethylene glycol monomethyl ether, the fraction distilling over within the range from 85° to 90° C. at atmospheric pressure, and containing the methoxy acetaldehyde, is separately recovered. This fraction may be redistilled with about 30% of benzene or the equivalent, for the removal of any water present therein. Fractionation of the water-free material in the usual manner then gives the pure aldehyde.

Although catalysts consisting of reduced copper, either alone or supported upon a solid inert carrier, such as silica gel, "Filtros", unglazed earthenware, and the like, have been found to effectively catalyze the reaction, exceptionally high yields of the alkoxy acetaldehydes are obtained by the use of catalysts containing, in addition to reduced metallic copper, small amounts of chromium, which catalyst preferably is supported upon an inert carrier, such as those mentioned immediately above. It is probable that the chromium is not reduced, but is present as an oxide, which probably is $Cr_2O_3$.

The following examples will serve to illustrate the invention, the scope of which is however in nowise to be regarded as limited thereby:

Example 1

The vapors of 50 c. c. of ethylene glycol monomethyl ether were passed over 304 c. c. of a reduced copper catalyst in a reaction chamber maintained at 300° C. 120 minutes were required for the ether to pass over the catalyst. The resultant reaction mixture was condensed at a temperature around 0° C. This condensate was fractionally distilled, and the fraction boiling around 85° to 90° C. and containing the methoxy acetaldehyde was separately recovered. By redistilling this fraction, the methoxy acetaldehyde may be recovered in purified form.

The optimum temperature for the dehydrogenation of methoxy acetaldehyde is around 425° C., but the reaction proceeds satisfactorily at 300° C., and at this latter temperature the life of the catalyst is much longer than at the higher temperatures.

The catalyst used in the above example was prepared as follows:

242 grams of $Cu(NO_3)_2.3H_2O$ were dissolved in 3 liters of water. To this solution, heated to 50° C., was added 340 c. c. of 10.5% ammonia solution (sp. gr. 0.958) over a period of ½ hour. The mixture was stirred at 50° C. for 2 hours, and the precipitate allowed to settle. The liquid was withdrawn and the precipitate washed three times with water. Each time the flask was filled with water, and the mixture stirred at 50° C. for 2 hours. The moist precipitated copper hydroxide was then forced through a die and formed into worm-like pieces. These pieces were dried overnight at 110° C., and were then charged into the catalyst chamber and were reduced to metallic copper at 300° C. in a stream of hydrogen.

Further data relating to this example are given in the table which appears hereinafter.

Example 2

The vapors of 966 grams of ethylene glycol monomethyl ether were passed at a rate of 386 grams per hour over 1200 c. c. of a copper-chromium catalyst supported on "Filtros" and maintained at 310° C. in a catalyst chamber. The methoxy acetaldehyde thus produced was recovered from the condensed products of the resultant reaction in the same manner as heretofore described in connection with Example 1.

The catalyst utilized in this example may be prepared by immersing chips of porous, artificial, filter stone (composed principally of silica, and sized between $\frac{1}{8}$ and $\frac{1}{16}$ inch mesh screens) in a concentrated solution prepared by dissolving 545 grams of $Cu(NO_3)_2.6H_2O$ and 11 grams of $Cr(NO_3)_3.9H_2O$ in 50 grams of water. The impregnated chips then are dried and roasted in a blast of air heated to about 600° C. until evolution of oxides of nitrogen ceases. This mass then is reduced with a stream of ethanol at about 250° C. Preferably the catalyst contains up to about 1% to 5% of the chromium, based upon the copper content. Such catalyst and method for its preparation are more fully described in U. S. Patent 1,977,750 to Marion K. Young.

Silica gel may be substituted for the "Filtros" in the preparation of the above catalyst, and yields a catalyst which consistently gives in the present process methoxy acetaldehyde efficiencies of around 40% or more.

*Example 3*

The vapors from 843 grams of ethylene glycol monomethyl ether were conducted at a rate of 140 grams per hour over 300 c. c. of a reduced copper catalyst supported on silica gel within a catalyst chamber maintained at 325° C. The methoxy acetaldehyde thus formed was stripped from the condensed reaction products and recovered in the general manner described in Example 1.

The catalyst used in Example 3 was prepared by dissolving 115 grams of copper nitrate trihydrate in 375 c. c. of water. To this solution 300 c. c. of silica gel, sized to 8-mesh, were added and intimately mixed therewith. After standing for 2 hours, the excess solution was drawn off, and the impregnated silica gel was dried in an oven overnight, after which the catalyst was reduced in a stream of hydrogen at 400° C.

A copper catalyst similar to the above but prepared from cupric acetate, instead of from the nitrate, also is suitable, but is somewhat less efficient than the latter.

The following table gives further data relative to the results secured in the foregoing examples:

| Alkoxy acetaldehydes | Example 1 | Example 2 | Example 3 |
|---|---|---|---|
| Production ratio, grams per liter of catalyst per hour | 7.2 | 55 | 33 |
| Overall yield, percent | 7.4 | 17.5 | 7 |
| Efficiency, percent | 34 | 91 | 88 |

The process of the present invention is applicable for the dehydrogenation of monoalkyl ethers of ethylene glycol in general, among which also may be mentioned the monoethyl-, and monobutyl ethers of ethylene glycol.

*Example 4*

The vapors of 2027 grams of ethylene glycol monoethyl ether were passed at a rate of 477 grams per hour over 1200 c. c. of the copper-chromium catalyst described in Example 2, in a reaction zone maintained at 310° C. The effluent vapors from the catalyst chamber were condensed in a water-cooled condenser. The condensate was rectified, and ethoxyacetaldehyde, boiling at 104 to 105° C. at atmospheric pressure was obtained. The production ratio was 38 grams per liter of catalyst per hour; the overall yield was 10%; and the efficiency was 90%.

The process may be operated successfully at subatmospheric and at superatmospheric pressures, though pressures around atmospheric are preferred.

The alkoxy acetaldehydes produced in accordance with the invention are useful as intermediates in the production of various organic compounds. Thus, methoxy acetaldehyde may be employed as a starting material for the production of methoxyacetic acid.

The invention is susceptible of modification within the scope of the appended claims:

I claim:

1. As a chemical compound, methoxy acetaldehyde, the same being a mobile liquid, miscible with water, boiling at 92.3° C. under a pressure of 770 mm. of mercury absolute, and having a specific gravity of .9818 at 25°/4° C.

2. Process which comprises passing vapors of a monoalkyl ether of ethylene glycol into contact with a dehydrogenating catalyst in a reaction zone maintained at a temperature within the range from about 300° C. to about 425° C., and separately recovering the aldehyde thus produced.

3. Process which comprises passing the vapors of a monoalkyl ether of ethylene glycol into contact with a reduced copper catalyst, in a reaction zone maintained at a temperature within the range of from about 300° C. to about 425° C.

4. Process which comprises passing the vapors of a monoalkyl ether of ethylene glycol into contact with a catalyst consisting of reduced copper together with a small amount of chromium in the form of oxide, in a reaction zone maintained at a temperature within the range of from about 300° C. to about 425° C.

5. Process which comprises passing the vapors of a monoalkyl ether of ethylene glycol into contact with a reduced copper catalyst, in a reaction zone maintained at a temperature within the range of from about 300° C. to about 425° C. and under approximately atmospheric pressure.

6. Process for making methoxy acetaldehyde which comprises passing vapors of monomethyl ether of ethylene glycol into contact with a dehydrogenating catalyst within a reaction zone maintained at a temperature within the range of from about 300° C. to about 425° C., and separately recovering the methoxy acetaldehyde thus produced.

7. The process as defined in claim 6, wherein a reduced copper catalyst is employed.

8. The process as defined in claim 6, wherein the said catalyst consists of reduced copper together with a small amount of chromium in the form of oxide, and wherein the catalyst is supported on an inert carrier.

9. The process of making an alkoxy acetaldehyde, which comprises passing the vapors of a monoalkyl ether of ethylene glycol into contact with a catalyst containing reduced copper in a reaction zone maintained at a temperature within the range from about 300° C. to about 425° C., and separately recovering the alkoxy acetaldehyde thus produced.

NATHAN L. DRAKE.